US007899936B2

(12) United States Patent
Fredriksson et al.

(10) Patent No.: US 7,899,936 B2
(45) Date of Patent: Mar. 1, 2011

(54) DEVICE IN A MODULARIZED SYSTEM FOR EFFECTING TIME-STAMPING OF EVENTS/REFERENCE EVENTS

(75) Inventors: Lars-Berno Fredriksson, Kinna (SE); David Lindqvist, Gothenburg (SE)

(73) Assignee: Xinshu Management, L.L.C., Dover, DE (US)

( * ) Notice: Subject to any disclaimer, the term of this patent is extended or adjusted under 35 U.S.C. 154(b) by 1233 days.

(21) Appl. No.: 11/184,821

(22) Filed: Jul. 20, 2005

(65) Prior Publication Data
US 2006/0069939 A1 Mar. 30, 2006

(30) Foreign Application Priority Data
Jul. 23, 2004 (SE) .................................. 0401922

(51) Int. Cl.
*G06F 15/16* (2006.01)
*G06F 1/12* (2006.01)
(52) U.S. Cl. ................. 709/248; 709/250; 713/400; 713/500
(58) Field of Classification Search ................ None
See application file for complete search history.

(56) References Cited

U.S. PATENT DOCUMENTS

| 4,815,110 | A | 3/1989 | Benson et al. |
| 5,392,421 | A | 2/1995 | Lennartsson |
| 5,402,394 | A | 3/1995 | Turski |
| 5,564,285 | A | 10/1996 | Jurewicz et al. |
| 5,896,524 | A | 4/1999 | Halstead, Jr. et al. |
| 6,118,936 | A | 9/2000 | Lauer et al. |
| 6,535,926 | B1 | 3/2003 | Esker |
| 6,766,368 | B1 * | 7/2004 | Jakobson et al. ............ 709/224 |
| 6,941,557 | B1 * | 9/2005 | Jakobson et al. ............ 719/316 |
| 7,139,938 | B2 * | 11/2006 | Marwaha ..................... 714/48 |

(Continued)

FOREIGN PATENT DOCUMENTS

EP 1191747 A2 3/2002

(Continued)

OTHER PUBLICATIONS

European Search Report by M. Milano dated May 10, 2006 for EP 05 44 5061.

(Continued)

*Primary Examiner*—John B. Walsh
(74) *Attorney, Agent, or Firm*—Fitch, Even, Tabin & Flannery (57) ABSTRACT

A device for a modularized system with decentralized and function-executing modules comprising a module with associated clock that is arranged to effect time-stamping of events associated with the system and of reference events selected from among these. The module comprises a memory device for storing the module's time stamps relating to the events noted by the module and to the reference events selected from among these. The module also comprises a microprocessor that generates messages related to the module's stored time stamps. In addition, the module is arranged to transmit the respective generated messages to a time conversion unit via one or more communications links, and the time conversion unit is arranged, after any intermediate storage, to relate the module's respective noted reference event and effected time-stamping to additional reference events and time-stamping introduced into the unit or already in the unit.

27 Claims, 5 Drawing Sheets

U.S. PATENT DOCUMENTS

| | | | |
|---|---|---|---|
| 7,464,154 B2 * | 12/2008 | Dick et al. .................. | 709/224 |
| 7,483,448 B2 | 1/2009 | Bhandari et al. | |
| 7,496,686 B2 | 2/2009 | Coyle | |
| 7,711,880 B2 | 5/2010 | Fredriksson | |
| 2004/0023678 A1 | 2/2004 | Fredrikkson | |
| 2004/0059807 A1 | 3/2004 | Klotz et al. | |
| 2006/0069939 A1 | 3/2006 | Fredrikkson | |
| 2006/0083265 A1 | 4/2006 | Jordan et al. | |
| 2006/0109376 A1 | 5/2006 | Chaffee et al. | |
| 2006/0156065 A1 | 7/2006 | Glass | |
| 2007/0094528 A1 | 4/2007 | Fredrikkson | |
| 2009/0077287 A1 | 3/2009 | Weigl et al. | |

FOREIGN PATENT DOCUMENTS

| | | |
|---|---|---|
| WO | 03/058468 A1 | 7/2003 |
| WO | 2004/015945 A1 | 2/2004 |

OTHER PUBLICATIONS

Response to Non-Final Office Action (EFS filed Feb. 2, 2010) for U.S. Appl. No. 11/554,370.

Roger Bou Faisal/OGU; EP Search Report Dated Jun. 13, 2005.

Written Opinion of the International Searching Authority from PCT/SE2005/000581 dated Jul. 4, 2005.

International Search Report for PCT/SE2003/001736.

Response to Non-Final Office Action (EFS filed Aug. 6, 2010) for U.S. Appl. No. 11/554,370.

* cited by examiner

DEVICE IN A MODULARIZED SYSTEM FOR EFFECTING TIME-STAMPING OF EVENTS/REFERENCE EVENTS

CROSS-REFERENCE TO RELATED APPLICATION

This application claims priority from Sweden Application 0401922-0, filed Jul. 23, 2004, which is hereby incorporated herein by reference in its entirety.

FIELD OF THE INVENTION

The present invention relates to a device in a modularized system with decentralized and function-executing modules, in which a module with associated clock is arranged to effect time-stamping of events associated with the system and of reference events selected from among these.

BACKGROUND OF THE INVENTION

Control systems and monitoring systems are of the real-time system type. In such systems, it is important to be able to relate different detected events to each other in time. In centralized systems, it is simple to fulfil the requirement by relating to a central clock. In distributed systems, the problem is greater as the physical connection to a common clock requires either special clock communications links and hardware or for local clocks to be used. For the alternative with local clocks, two solutions are described that can be regarded as the background art:
1. synchronizing of local clocks to a master clock.
   SE 466 123 describes how local clocks can be synchronized to a selected reference clock with utilization of signals on a common bus link.
2. Conversion of local times.
   EP 0570 557 describes how local clocks can convert their local time to that of another and vice versa, with utilization of signals on a common bus link.

Both the solutions require the modules to be connected to a common communications link and also require the modules to have a common protocol for time messages. This limits the choice of modules for a system architect. Many systems consist of subsystems that are connected together via gateways. This leads to a problem for the system designer when subsystems are to work together in real time, as the subsystems are not interconnected to a common communications link. A special category of monitoring system comprises analysis tools. The actual analysis software is usually executed under an operating system that does not have real-time characteristics, for example Windows or Linux. It is common in industry for the analysis to cover several subsystems that work together. Within the automobile industry, CAN and LIN systems and CAN High Speed and CAN Low Speed are commonly used. Each system is analysed via one or more connections to respective subsystems via hardware configured for the analysis tool that comprises a common clock function for time-stamping. The product "Sync Box XL" from Vector Informatik GmbH is an example of the background art. Here there is a special synchronizing lead for generating synchronization pulses. Upon the reception of a high-to-low edge on this lead, each connected unit time-stamps this event. This solution requires a special hardware arrangement and, in addition, it must also be ensured that electromagnetic interference does not give false time indications. There is thus a need to enable different modules to work together at system level within given time frames without a common protocol for time synchronization and a need to be able to time-relate information from one module to information from other modules without special hardware or communications links for processing in a computer without a real-time operating system. The proposed solution solves both problems.

There is also a need to be able to eliminate arrangements for synchronizing local clocks to other clocks, that is a need for a device to eliminate the requirement for synchronization of a clock in one module to a clock in another module. In addition, there is a desire for increased configurability and more ways of relating times and events. Communications links must be able to be utilized together with reference events and different clocks. In addition, there is a desire for increased freedom of action and to be able to achieve different solutions to the problem in question. Global time must be able to be utilized, and also stand-alone clocks. It should also be noted that during adjustment of clocks, the system function can not be utilized.

SUMMARY OF THE INVENTION

The principal characteristic of the invention is that events are identified at system level that are detected by two or more modules within a given time margin and time-stamping of these events is utilized in order to convert, in one or more conversion units, the respective module's local time domain to a time domain suitable for the system's function for coordinating or monitoring of events or groups of events. PCT/SE2003/001736 describes, among other things, how such an analysis can be carried out. Knowledge of the time relation between the identified event or events and ability of the detected units to provide time information is utilized by a time converter in order to convert time information from one unit to one or more receiving units by calculation and by knowledge of the characteristics of the receiving units. The time information can be both direct, in the form of time-stamping of messages or events, and indirect, in the form of configuration information for units with configurable local clocks. The time converter can continually monitor the quality of time indications from connected units. A characteristic is thus that the process is asymmetric. Modules that work together do not need to be in direct connection with each other and do not need to have a common protocol for time synchronization in order for the system to be able to operate in real time or in order for a monitoring system to be able to relate events in the system to a time base that is suitable for the monitoring.

The more concrete characteristics of the invention are, among other things, that the module comprises memory devices for storing the module's time stamps relating to the events noted by the module and to the reference events selected from these, and that the module comprises a microprocessor that generates messages related to the module's stored time stamps. In addition, the module is arranged to send the respective generated messages to a time conversion unit via one or more communications links. According to the invention, the time conversion unit is arranged, after any intermediate storage, to relate the module's respective noted reference events and effected time-stamping to additional reference events and time-stamping introduced into the unit or already in the unit.

Further developments of the concept of the invention are apparent from the following subsidiary claims.

BRIEF DESCRIPTION OF THE DRAWINGS

A currently proposed embodiment of a device that has the significant characteristics of the invention will be described below with reference to the attached drawings in which.

DETAILED DESCRIPTION

Figure 1:
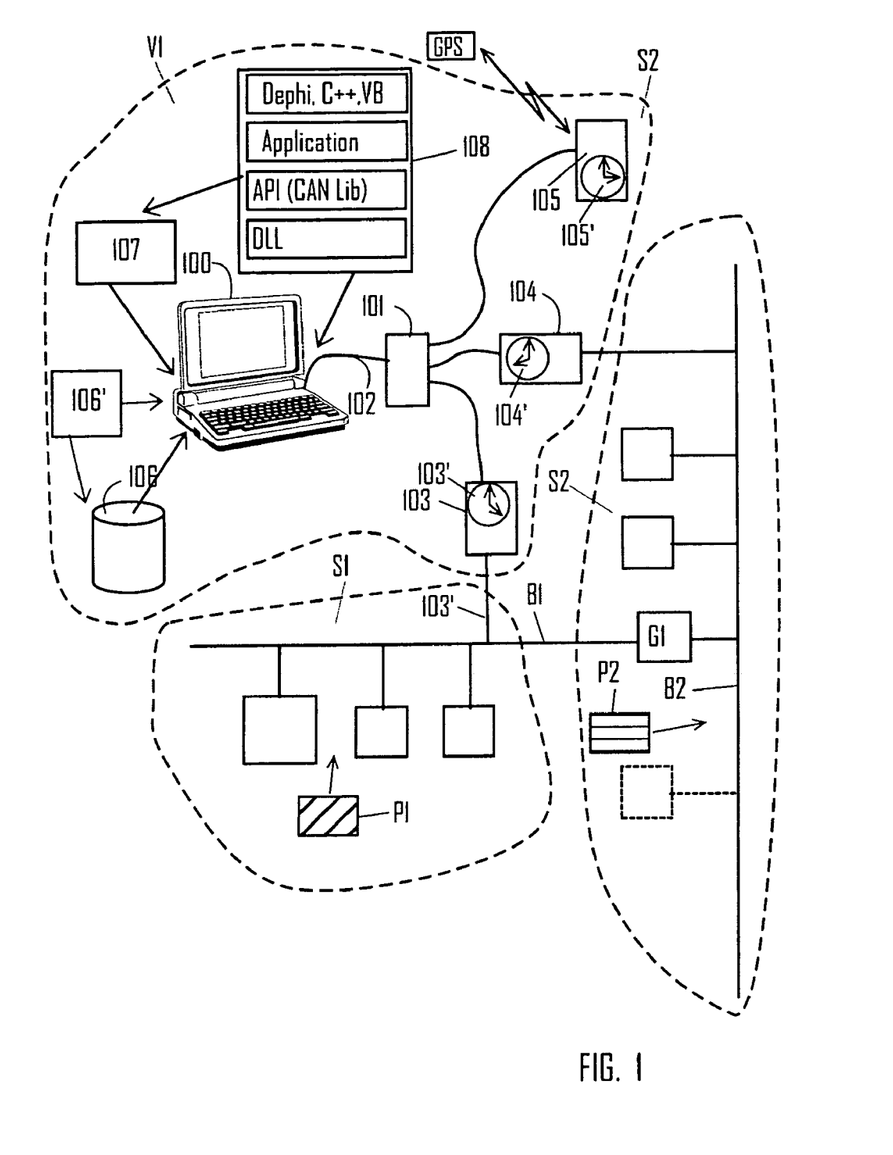
FIG. 1 shows schematically and in outline, a monitoring system in the form of an analysis tool arrangement.

FIG. 1 shows a monitoring system in the form of an analysis tool arrangement V1 that is to analyse systems S1 and S2 and their interaction. The tool or the tool arrangement consists of a number of modules or units that are shown schematically in FIG. 1, in which unit 100, the basic unit, comprises a unit suitable for communication with people and with peripherals and provided with a USB master port, for example a PC of conventional type or a PDA with USB OTG (On The Go). In one embodiment, a unit 101, that comprises a USB hub, is connected to the unit 100. In many cases, such a unit is integrated into the PC. The connection is carried out via a connection 102 of the current type for USB. The unit 101 has a number of channels, normally four or seven, over which the PC's USB channels' bandwidth is distributed. An interface unit can be connected to each channel that can be connected to the target system's communications link. This unit comprises a microprocessor with requisite peripherals and software for receiving messages from and, if required, also sending messages to the communications link in accordance with the link's protocol. Two target systems, S1 and S2, are shown schematically in the figure, that are interconnected via the unit G1 which enables interaction between the systems, for example a gateway or a master unit. S1 operates with the protocol P1 and S2 with the protocol P2, for example LIN and CAN with associated HLP (Higher Layer Protocol) respectively. The PC is connected to S1 via the communications link 102, the protocol converter unit USB to/from P1 103 and the connection 103' to the system connection bus B1 and to S2 via the communications link 102, the protocol converter unit USB to/from P2 104 and the connection 104' to the system connection bus B2. Additional units of special nature for supplying information that is not available to the target systems can be connected. This is exemplified by the unit 105 which can receive GPS information. The basic unit 100 contains a database 106 that is suitable for the purpose, an application 107 working with this, and an application interface (API) with requisite DLLs interfacing with the units 101, 103, 104 and 105. Using the database editing/configuration program 106', the user can edit the database and state how values in this are to be interpreted and represented on the display screen in the tool and also how the different interface units are to be configured. Entering of interpretation data can be carried out directly from the PC's keyboard or from a configuration file. Examples of database editors are "Navigator Database Editor" and the configuration program "Kvaser Configurator" from Kvaser AB, SE. The application is written in a commonly occurring language, for example Delphi, C++ or Visual Basic. An example of an application is Kvaser Navigator and an example of an API is CANlib from Kvaser AB. The construction is shown schematically by 108.

In the arrangement described above, the invention is described as using USB. In a USB connection to several channels via a HUB, a Start Of Frame bit sequence is generated from the PC's USB adapter that propagates through the HUB to connected units and is detected by these. This is utilized as a reference event. An SOF packet is transmitted normally and has a sequence number, which facilitates correct association of time stamp to reference event. The USB packet propagates out in a USB system in a defined way and a USB adapter (host) can be regarded as a reference event generator in a specific time domain, separated from other time domains, for example the domain in which an application under Windows operates, in the same PC that contains the USB adapter. The reference events can be transmitted to all units that are included in the same USB arrangement, that is all units can detect the same SOF packet simultaneously. By "simultaneously" is meant here a maximum of 50-100 ns jitter in the detection for all the units plus up to a couple of hundred ns constant delays. In a USB HS (High Speed) arrangement, the maximum delay can be 26 ns in the cable, 4 ns in "hub trace", 36 hs-bits in the hub electronics in a maximum of 5 levels plus 30 ns for connecting in the last unit, making 530 ns in total. The time jitter for SOF in an HS communications link on account of the USB protocol can be a maximum of 5 hs-bits per hub and a maximum of 5 hubs can be connected in a thread, which gives a maximum uncertainty of 25 hs-bits, which corresponds to a time inaccuracy of approximately 50 ns for the propagation of an SOF through a USB thread.

The respective units connected to 101 are provided with a local clock 103', 104', 105' and the time of the detection of SOF is recorded. Each connected unit sends its clock value to the PC via USB and a program in the PC can convert the respective times to a common time base. The application can thereby relate to each other in time both more recent and older events that are time-stamped by the respective connected interface unit. This method resembles the one described in EP 0570 557, but differs in one important point: the time information goes only one way and receiving units do not send their time back and thus do not need to relate time messages to any particular clock. In the case described above, no clock is utilized at all in the PC, which solves a well-known problem for analysis tools that work under protocols with poor real-time characteristics such as, for example, Windows. As the PC works as time converter and is not dependent upon a particular clock for this, the accuracy is only dependent upon the connected interface units' accuracy in the time-stamping of SOF. Protocols other than USB can be used and reference events need not be confined to appearing on the communications link.

In many cases, it is desirable to be able to refer events that have occurred to a time base that is common to many systems. A very general time base is UTC that can be reached via GPS. FIG. 1 shows a GPS module 105 that is connected to the PC 100 via the HUB 102. The module 105 receives UTC time and associated epoch signal from GPS and time-stamps the reception according to the time of the local clock 105'. It also time-stamps SOF in USB. The PC thus obtains both time-stamping of SOF, a reference event, and the reception of UTC time, an event, time-stamped by one and the same clock 105'. The PC can thereby relate SOF to UTC time and thus convert times according to 105' to UTC time and do the same for 103' and 104'.

Figure 2:
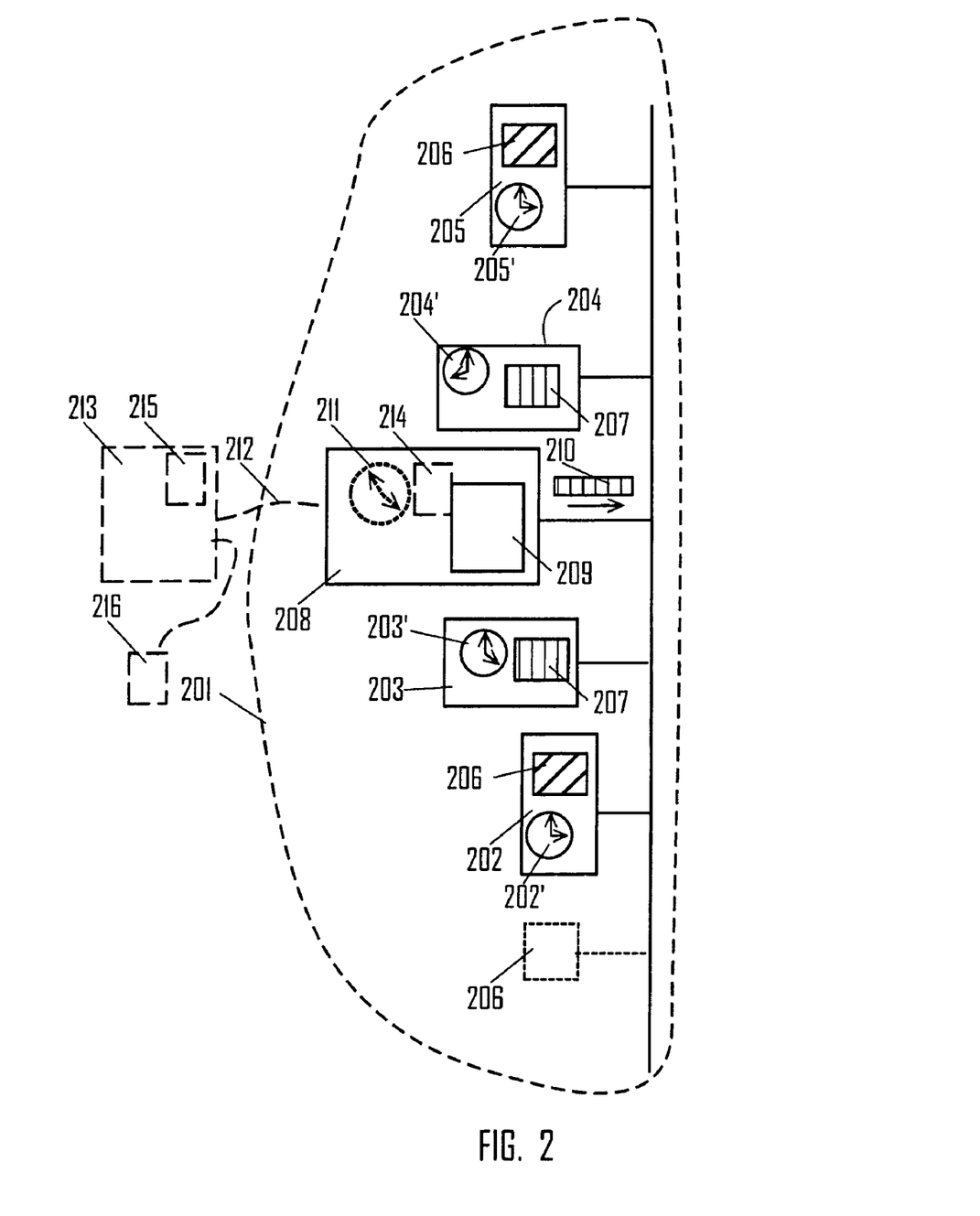
FIG. 2 shows schematically and in outline, a system with modules.

FIG. 2 shows a system 201 consisting of the modules 202-205 plus additional modules, that do not affect the invention, symbolized by 206. In this case, the system designer has found that the modules 202, 203, 204 and 205 fit in so well that they are almost time-synchronized. 202 and 205 are designed according to a time-synchronization protocol 206 based on ideas according to SE 466 123, that is synchronization of respective local clocks 202' and 205' to one of the modules that is selected as master. 203 and 204 are designed according to a time-synchronization protocol 207 based on ideas according to EP 0570 557, that is local conversion of respective local clocks 203' and 204' to a common reference time. The protocols 206 and 207 contain considerable differences in detail as they were developed independently of each other. According to this invention, the system designer introduces a module 208 into the system that has a time conversion function 209. This sends out a message 210 that is received and time-stamped by the modules 202-205. According to the invention, the message is a reference event. The module 209 asks the respective modules 202-205 for the time of the reception of the message 210. The conversion function can thereby convert the respective module's time to a comparative time. As the system designer selected the modules, he has detailed knowledge of the protocol and can thereby correct for any protocol-specific time deviations that arise in the time-stamping of the message 210 and can also introduce methods that synchronize the times of the different modules. For example, a time message from the module 205 according to the protocol 206 can be set up as "a time-registering start signal applied to the data bus" for the modules 203 and 204 according to the protocol 206. When the module 209 receives the time message, the time value is repackaged and, if required, converted to a message according to the protocol 206 and transmitted. In this way, the modules 203 and 204 can be synchronized with 205 even though they use different protocols. 205 and 202 are synchronized by the common protocol 207. By this means, all the modules 202-205 are synchronized to a common time through the module 209 that does not have a clock.

The method can be cascaded by providing 209 with a local clock 211, a communications link 212 to an additional unit or system 213, for example a previously described monitoring system, and requisite functionality 214 and 215. The local clock 211 is used to time-stamp reference events from 213. The combined time-conversion function 209/214 converts all time information from the system 201 to local time according to the clock 211 for communication with 213. By means of the invention, 213 can thereby time-relate information from other units and systems that are connected to it, symbolized by 216, in a simple way.

A system can contain several time converters that serve different groups of modules. A time converter can be located anywhere in the system, but location at a common point is advantageous as far as efficiency is concerned. Time converters can carry out conversion from one unit to another via a selected reference time or alternatively according to the all-to-all principle, that is directly from each unit to each other unit. A logical conversion matrix can thereby be utilized. A matrix that can keep track of how conversion is to be carried out quickly from all-to-all can, however, assume large dimensions and require large resources to keep updated (the complexity scales quadratically), but gives as a result faster conversions. It is also possible to carry out the time conversion only by keeping the reference time stamps updated, but this results in more work per conversion. The conversion unit can keep statistics of how well the clocks are related and send this information as a parameter together with the measurement value. The inaccuracy can be calculated and sent together with each measurement value. The conversion function can be carried out with greater accuracy thereafter, that is when an additional reference message has been exchanged. In connection with this, for example, the derivative for the current period can be used instead of assuming that the same derivative applies as for the preceding period. Expressed more generally, interpolation is utilized instead of extrapolation for determining a value. This ability is of particularly great significance for analysis and verification of a system's function. To sum up, it can be said that each unit/module that has been given access to the occurrence of reference events in different time domains can be arranged to carry out conversion between the time domains irrespective of whether the units/modules are themselves comprised in or represent any of the said domains or not. In order that no ambivalence shall arise concerning to which time domain a particular indication belongs, a protocol should be implemented that, for example, indicates who converts what and to what extent a unit's incoming/outgoing indications are to be regarded as belonging to the sending and/or receiving unit's time domain.

The conversion function can be carried out by offset between the first and second times being added to the time that is to be converted. With this method, only little compute power is required for the respective conversion. Synchronizing/relating is preferably carried out frequently with this method, in order to minimize the effect of respective clocks drifting in relation to the other clocks. The conversion can also be carried out by both offset and fixed frequency error compensation (drift compensation). The conversion $A_x$ to $B_x$ (new and old refer to reference time stamps) can be carried out according to:

$$B_{ox} = B_{new} + (B_{new} - B_{old}) * (A_x - A_{new})/(A_{new} - A_{old})$$

Given a computer with limited numeric resolution and/or calculation accuracy and given that the times A and B are already scaled to be approximately equal (the derivative between them is approximately one), the following method can give better results:

$$B_{ox} = B_{new} - (A_x - A_{new}) + (((B_{new} - A_{new}) - (B_{old} - A_{old})) * (A_x - A_{new}))/(A_{new} - A_{old})$$

Viewed analytically, the two methods are equivalent and are based on linear regression. As the calculations are carried out by a computer, discrete values must be used, which implies limited resources for representation of quantities, which means that the sequence of operations is important. Irrespective of the method, care must be taken so that the calculation does not overflow or lead to truncation in an unwanted/unpredicted way. The latter method can be a way of making this easier.

Figure 3:
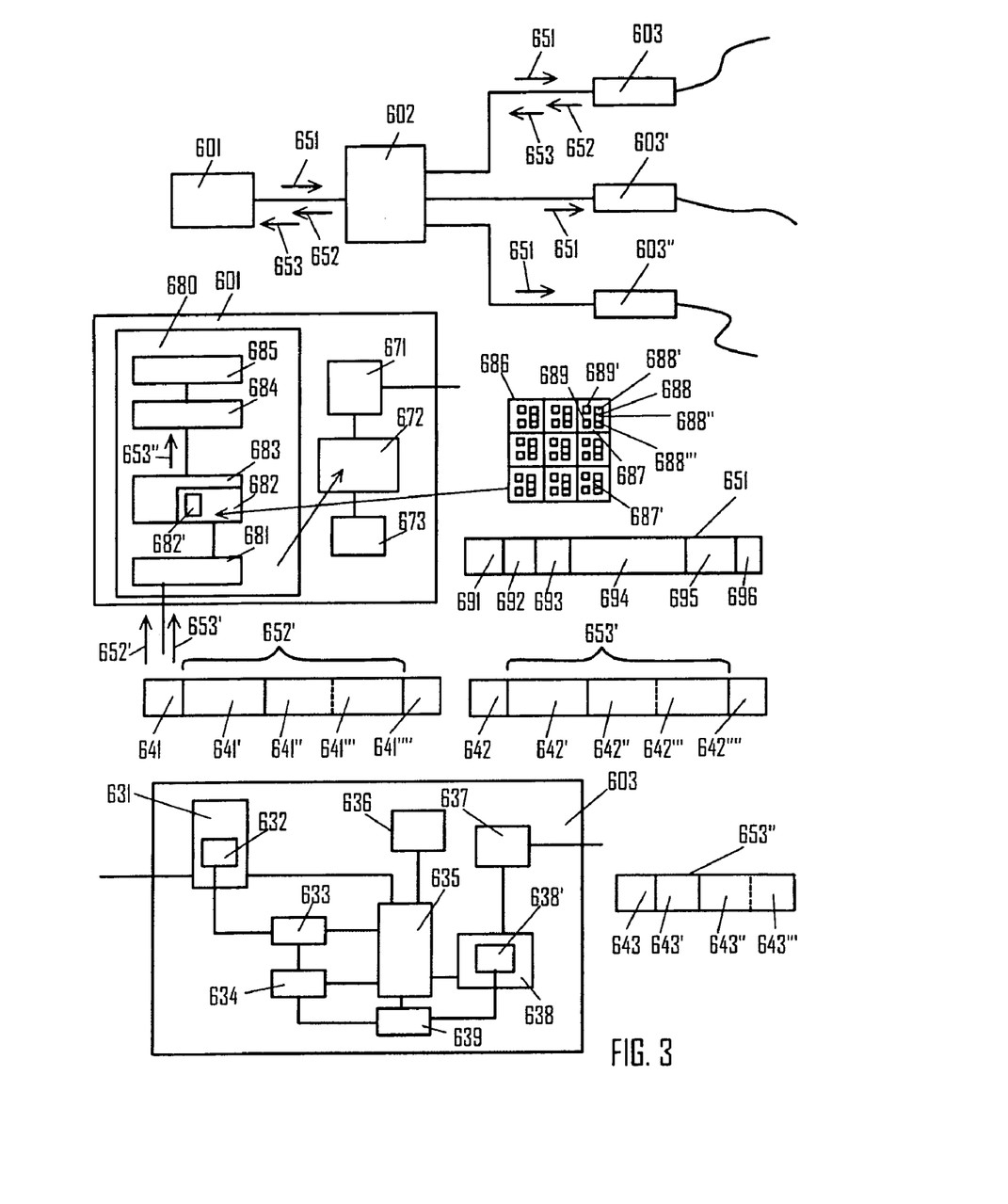
FIG. 3 shows schematically and in detail, a system in which the USB protocol's SOF packets are utilized as reference events for time relating.

FIG. 3 shows a detailed embodiment of how the USB protocol's SOF packet can be utilized as a reference event for time relating in accordance with the invention. The system comprises a number of units 603, 603', 603". These are connected via one or more USB hubs 602 to a computer 601, for example a PC. 601 sends SOF packets 651 at regular intervals, in accordance with the USB protocol. A Start-Of-Frame packet, SOF, typically contains a Start-Of-Packet/Sync field 691, an identification field 692, the identification field inverted 693, frame number 694, CRC field 695 and a concluding End-Of-Packet field 696. 603 contains a USB controller 631 which, in turn, contains a device 632 designed to detect SOF packets 651. The detections in 632 are arranged to trigger a reading off of the clock 634 to a capture register 633. The time saved in this way is hereafter called Tref. Both the clock and the capture register can be read by the microprocessor 635. Both 633 and 634 should advantageously be able to be incorporated in 635. Program code is stored in the memory 636 and, for example, is run each time 635 receives an SOF packet from 631. The program can, for example, read off the frame number of the SOF packet and, depending upon requirements and conditions, always or at certain intervals read Tref from 633 and send a new USB packet 652 by means of 631 via 602 to 601. 603 also contains configuration electronics 637 for a CAN controller 638 which, in turn, contains a precise detection mechanism 638' for when CAN messages commence. The detection mechanism also triggers a capture register 639 which then reads off 634. The time stamp that is found in 639 can be sent in a packet 653 to 601, together with the message that triggered the reading off. The packet type 653 can, for example, consist of USB overhead 642 and 642'''', data 642', from the CAN controller 638, a time stamp 642'', of when the data 642' was received by 638, and any additional data with associated time stamps 642'''. The packet type 652 consists, in addition to the overhead 641, 641'''' that is provided by USB, of a Tref 641', the sequence number of the SOF that gave rise likewise to Tref 641'', and any additional Trefs, with associated sequence number and/or other data, 641'''. 601 is arranged with a USB host 671. As already mentioned, SOF packets 651 are sent 671 at regular intervals in accordance with the USB protocol. When the computer receives packets of the type 652 from its connected units 603, 603', etc, via the USB host 671, these can be read and processed by the processor 672 using the program code in the memory 673. In the processor, among other things, program code is run according to the logical data flowchart in 680. 681 represents here the USB drive routines that constitute a part of the operating system that is utilized by 601. These keep a check on the physical structure of the USA system and read out data packets from the controller 671. If these packets originate from any of the units 603, 603', etc, they are forwarded via the time-handling functions 682 to the drive routines 683 intended for this purpose. If the messages are packets of the type 652, the information 652' is extracted from then, that is the so-called Trefs 641', likewise sequence numbers 641'' and any other data 641''', and they are processed by the time-handling functions 682 that are a part of 683. The system is, after all, intended to be used, and it is represented here by a user application 685 that logically communicates directly with the units 603, etc, but in practice this takes place via the generally known interface 684 that provides all the functions that a user can utilize in the units. The interface 684 thus connects together the program 685 with the units' drive routines 683. The interface displays, for example, if so required, all the time stamps from the different units along one and the same time axis, which is carried out by means of the time-handling functions 682, completely in the spirit of the invention. In the figure, this is exemplified by the message 653 being sent from a unit 603 to 601. Unit 671 decodes the packet and forwards the content 653' to the processor 672 for further processing. For example, unit 681 sees that the message originates from a unit of the type 603 and forwards it to the drive routines 683 intended for this. The time-handling functions 682 in 683 see that the message contains a time stamp 642'' in a local unit's time, and so it converts this to a suitable time in accordance with, for example, the following method. The converted time 643' and any calculated inaccuracy 643'' are displayed together with data 643 (that is 642' possibly further processed by 683) and any other information 643''', taken as a whole 653'', to the application 685 via the interface.

The time-handling functions 682 can be divided into a part that saves and handles a history 682' of Trefs with corresponding sequence numbers that come from the packets 652' and information about the original unit and keeps conversion functions updated and a second part that carried out the actual conversions. In order to be able to carry out direct conversion between all units' times, a kind of logical conversion matrix 686 can be utilized. For each pair of units 687, 687', etc, whose times are to be able to be directly converted, there is a list 688 with the most recently matched pairs of Trefs 688',  688'', etc. These Trefs 688', etc, can then be utilized to carry out a conversion between the times of the units in question, for example according to:

$$B_{ox} = B_{new} + (B_{lew} - B_{old})*(A_x - A_{new})/(A_{new} - A_{old})$$ or alternatively $$B_{ox} = B_{lew} - (A_x - A_{new}) + (((B_{lew} - A_{new}) - (B_{old} - A_{uld}))*(A_x - A_{new})/(A_{new} - A_{uld})$$

where $A_x$ is to be converted to $B_x$ using the matched Tref pairs $(A_{new}, B_{new})$ and $(A_{old}, B_{old})$ that thus can correspond to 688' and 688'''. As shown, there are some of the calculations that can be carried out in advance, for example $(B_{new} - B_{old})$ and $(A_{new} - A_{old})$ in the first alternative and $(B_{new} - A_{new})$ and $(B_{old} - A_{old})$, etc, in the second alternative. As stated, such calculations can advantageously be calculated in advance and saved in a location 689 intended for the purpose, in order to simplify and thereby speed up future conversions. The relevant statistical inaccuracy can also be calculated and saved in a location 689' intended for the purpose. It is, of course, possible to carry out a very complex and thorough estimation of any inaccuracy on the basis of the whole history of matched Tref pairs, but in order to give a simple illustrative example, one of the Trefs in a pair 688' can, for example, be converted by means of two other pairs in the list 688. The converted Tref is then compared with the actual Tref in the said pair. The difference between them can be regarded as a simple measurement of inaccuracy/non-linearity.

Another variant of the conversion matrix can be to let a row/column represent a virtual time on the basis, for example, of a comparison of suitable other times.

A simpler variant of the conversion matrix is the special case when only one or a few rows/columns in the matrix are kept updated in the way described above. As each row/column can provide information concerning how time relating can be carried out from and to a particular time, this time can be utilized as a kind of master/intermediate time in conversions between two other times. This can result in an alternative that is less memory intensive and/or resource intensive in comparison to keeping the whole matrix updated, at the expense of somewhat more complicated conversions and/or possibly greater inaccuracy.

The conversion function 682 can be broken down into a number of subsidiary elements which, however, do not all necessarily need to be carried out in each unit that is arranged with the function. Certain elements can be carried out by one unit that then sends the information to another unit that thus does not need to carry out the said element. Examples of subsidiary elements:

1. are collecting and keeping track of the time-stamped reference function execution for each time that is to be able to be converted.
2. are finding, from among collected time stamps, time stamps from different units for the same reference function execution.
3. are determining, on the basis of these matched time stamps, how any conversion is to be carried out, depending upon given preconditions.
4. can be determining, on the basis of matched time stamps, how sound/accurate a certain time can be considered to be, for example using statistics.
5. can be, if a time is considered to be unsound/inaccurate, to request more frequent time-stamped reference function executions from the system.
6. are carrying out conversions when so requested.

In the embodiment, the USB protocol has been used by way of demonstration and the reference event is transmitted on the USB communications link. The invention is not dependent upon the USB protocol, but other protocols can be used. Nor does the reference event need to be connected with the communication. In order to utilize the invention, it is only necessary for the following preconditions to be fulfilled:
1. The conversion unit must be able to communicate with other units
2. The respective other units each have a local clock
3. One or more reference events are selected by the system designer
4. Other units can detect any reference event
5. Other units can relate a reference event to their local clock
6. The respective other unit can inform the conversion unit of the time of the detection of a reference event
7. The conversion unit can, with knowledge of time relationships between the selected reference events, of which other units detect the respective reference event and of the respective other unit's internal time-stamping function, convert another unit's time to a different other unit's time and vice versa, or alternatively to any other time base.

Figure 4:
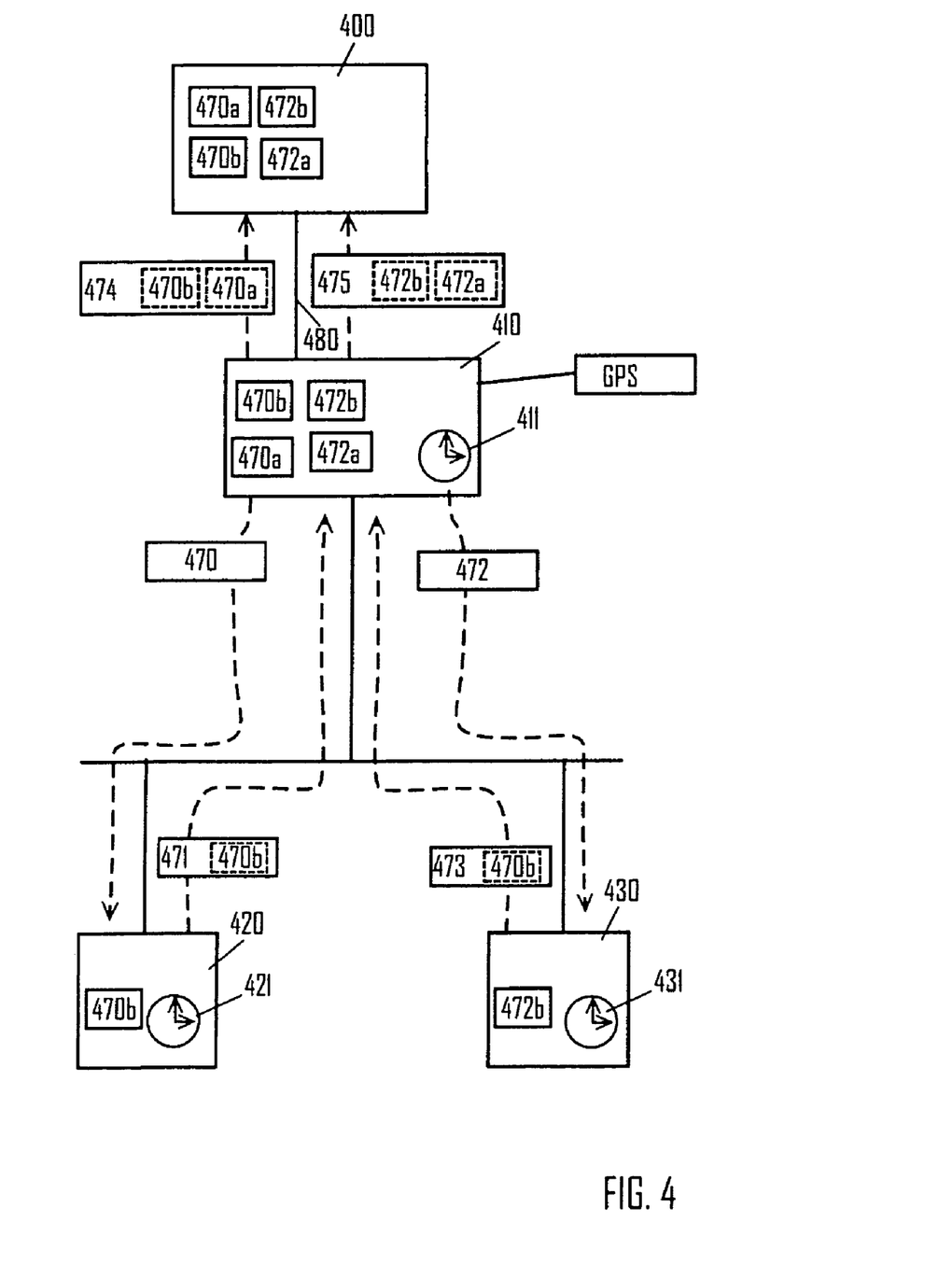
FIG. 4 shows schematically and in block diagram form, an example of a time conversion unit in which the module utilizes Ethernet for the communication.

FIG. 4 shows an a embodiment of a time converter in which the module units use Ethernet for communication. What will be highlighted primarily in the following description is the fact that all the units do not necessarily have to time-stamp precisely the same reference event, provided that the time between the reference events that are used is known. Ethernet is used as the basis for many different communication protocols. At transceiver level, bits are detected on the communications link and, at controller level, bit patterns that distinguish Ethernet messages. When the controller has ascertained that a correct message according to the Ethernet protocol has been received, this is indicated to the next protocol level, for example TCP/IP, that determines how the message will then be processed, for example whether the message is addressed to the module in question, whether it is to be combined with other messages into a file, etc. Depending upon the design of the communication electronics, an electrical signal is generated upon the detection of an Ethernet message or at a later occasion in the sequence of operations. This signal can be used to trigger a reading off of the local clock and can be used as a reference event.

The system comprises the module units 410, 420 and 430, each of which is provided with a local clock 411, 421 and 431. For a reason that the modules do not necessarily know about, they time-stamp both incoming and outgoing messages, for example 470-473, and upon request they send information based on the time stamps to the unit 410, which also time-stamps all incoming and outgoing traffic. The time converter 400 can then, by means of the time stamps that the module 410 has collected from other modules and also 410's own time stamps, directly relate any two clocks in the system. The time converter 400 can be connected so that it communicates directly with 410 on a separate communications link, or alternatively on the same communications link as other units. In order, for example, to relate the clock in 420 to the clock in 430, the following method can be used by 400:

A message 470 from 410 to 420 is given the time stamp 470a by 410 and 470b by 420. In the same way, a message 472 from 410 to 430 is given the time stamp 472a by 410 and 472b by 430. These two messages are naturally separate events, but can also be regarded as a common reference event for 420 and 430 with known time between the reception by the respective units, that is 472a minus 470a. The pair of reference time stamps is thus:

(470b, 472b-(472a-470a))

The message 470 is sent by 410 to 420 and is time-stamped 470a according to the clock 471. The same message is time-stamped by 420 according to the clock 421 as 470b. This time value is sent to 410 in the message 471. The same procedure is applied to the module 430 with the message 472 and the return message 473 that results in the time-stamping of 472 according to the clock 431. 410 sends the time stamps 470a and 470b with the message 474 and the time stamps 472a and 472b with the message 475 on the communications link 480. As both 470a and 472a are given in unit 410's local time, it can be expedient for these first to be converted to 430's local time in the given example. The pair of reference times thus obtained can thereafter be utilized in accordance with methods described in this patent in order to relate 420's local time to the time in 430. It should also be pointed out that the communication route to 410 can be varied in many ways within the concept of the invention. The most important thing is that the unit 400 obtains the information 470a, 470b, 472a and 472b in order to be able to carry out time conversion.

If the unit 410 has, in addition, a GPS receiver connected to it, it can, for example, time-stamp the second ticks that the GPS receiver provides and, in this way, enable the time converter to relate the system's different local clocks to UTC and the physical second.

The example shows that the application of the invention does not require the modules involved to need any common communications link, but can be applied as soon as the detection of events and local time-stamping of these can be carried out and does not require the identification at system level of event sequences that have time-relations that are known or that can be measured.

Figure 5:
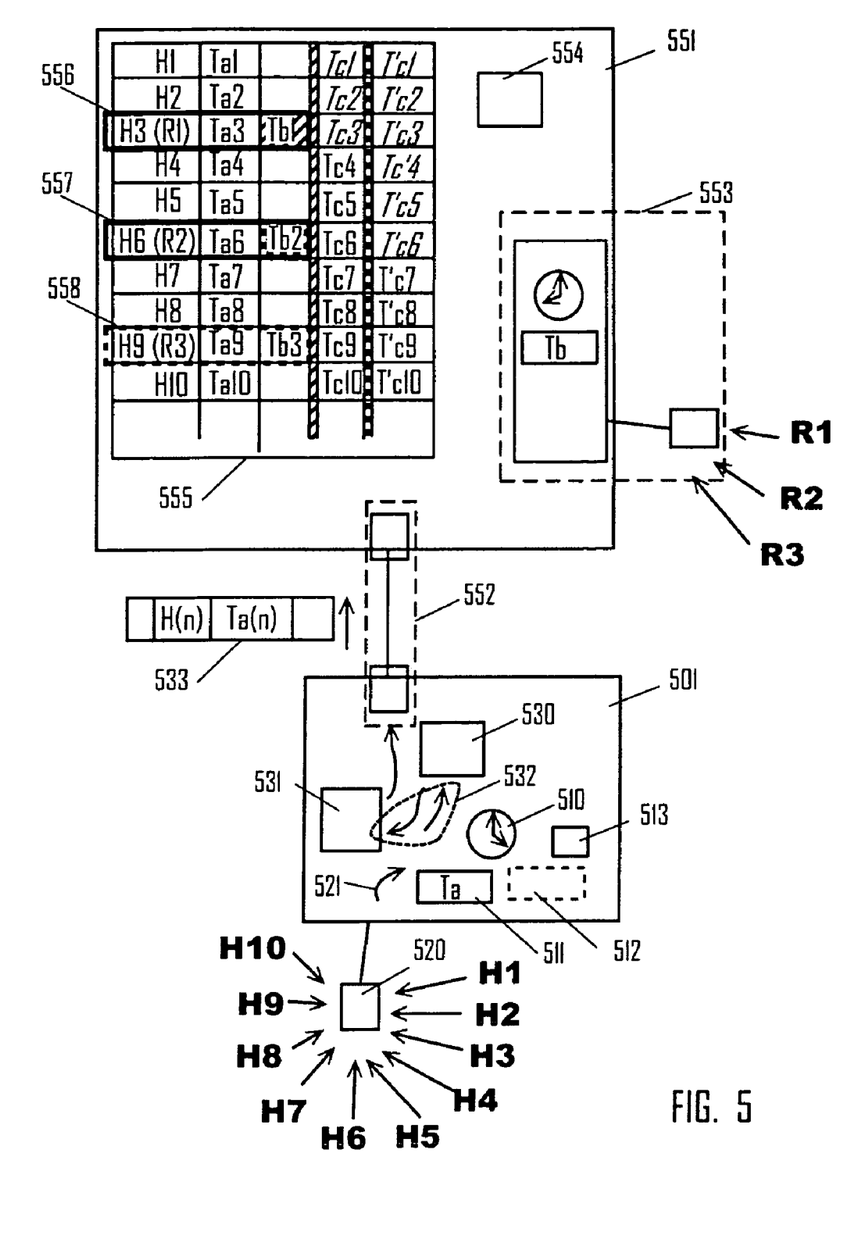
FIG. 5 shows schematically and in block diagram form, a construction with modules, clock functions, capture register and event detector.

FIG. 5 describes a simple construction of the invention that explains the concept of the invention. A module 501 comprises a clock function 510 with one or more capture registers 511, 512. An event detector 520 is arranged to detect the events H1, H2, H3, etc, and upon the detection of an event, the detector generates a signal 521 that triggers the storage of the clock's 510 time in the register 511. The event is thereby time-stamped according to the time Ta. The clock 510 generates a local time according to a local time base. Time values according to this time base are designated Ta. The CPU 530 reads the register 511 and transfers the value to the memory 531 which is represented in the figure by 532. The CPU creates a message 533 with information about the event, represented by H(n), and the time of its occurrence according to the time base Ta, represented by Ta(n). The module 501 is connected to the unit 551 via a communications link with requisite hardware and software, represented by 552, for the communication between module and unit. The communications link can be constructed according to any commonly occurring type, for example USB, CAN, Ethernet, TCP/IP, IEEE 802.11, Bluetooth, etc. The unit has access to a clock function, represented by 553, which can time-stamp the events R1, R2, R3, etc, according to the time base Tb in the same or a similar way to that described for the module 501. The CPU 554 stores information from the module 501 and the clock function 553 in the memory 555. The CPU stores this information in the memory 555 in the sequence in which the unit 551 receives information about time-stamped events from the module 501. In this way, a table is created with H1-Ta1, H2-Ta2, H3-Ta3, etc. At system level, it is known that the event H3 that is detected by the module 501 is the same event that the clock unit 553 detects as the event R1. The same applies for H6 and R2 and for H9 and R3, that is each pair of events is the same event detected and time-stamped by different units according to respective unit's local time base. As the detected pair of events emanates from one and the same event, it is suitable as a reference event and is now utilized in the unit 551 in order to time-stamp the events H1, H2, etc, according to a time base Tc. The event R1 is stored in the memory 555 and the times according to Ta and Tb can thereby be coordinated and represented as Tc. The information 556 about the current offset between Ta3 and Tb1 can be calculated as Toff=(Ta3−Tb1). If Tc is set equal to Tb, the next event H4, Ta4, can be converted directly to Tc4=(Ta4−Toff). Now historical times can also be converted, which are displayed in italics, Tc1, Tc2 and Tc3. The next occurrence of a reference event is H6. With the stored values 557, a new offset value can be calculated and thereby also how quickly the two clocks are running in relation to each other. With the new offset value and an on-going correction of time information according to Ta with regard to the phase difference between Ta and Tb, a new time base T'c can be created and the event H6 can be related to the time T'c7. The historical values for H1 to H6 can now also be converted to the base T'c. The next reference event information 558 can be used for verifying conversion factors or for creating an additional refined time base T"c. The use of even this simple application of the invention will be apparent if it is assumed that the clock function 553 is well calibrated for precise time indication with the physical second as base, while the clock 510 bases its time base Ta on pulses from a local oscillator 513. Physical calculations are often based on the physical second and it is therefore important that time indications of measurement values refer to the physical second. Using the invention, measurements carried out by modules with simple uncalibrated clocks can be utilized, as the times can be corrected by time conversion based on an accurate clock in the system.

In the example above, the detection of one and the same event, such as H3 and R1, is used as a reference event and the starting point for time conversion. Detection of different events A and B can be used provided that the time between the occurrence of A and the occurrence of B in a common time base is known or can be measured. As described above, time conversion from one time base to another can be carried out directly upon obtaining time-stamped information as soon as the conversion factors between the time bases are known. Historical values can be converted for better accuracy and the quality of time indications from different sources can be monitored continually. Where and when time conversion is carried out is completely dependent upon the nature of the overall problem. In distributed systems, it is common for information to be logged in the system in order to verify correct function of the system or for the cause of errors to be found afterwards. Detections of measurement values are typical events that are time-stamped. Logging of measurement values and associated times can be converted directly to a common time base but a better alternative can be to store the time indications according to respective local time bases and, in the subsequent analysis, to select suitable reference events as the starting point for the time conversions. As shown above, historical values can be converted with greater precision the more reference events are available and, in general, there is more computer capacity available for analysis than for logging.

A first unit with processor and application a communication device with two or more channels a first event common to the channels and able to be detected on the respective channels or alternatively, several first events whose time relationships can be determined two or more second units with processor and software each with a first communication device that can work together with the first unit's communication device each with a local clock a common communication protocol each communicating with the first unit via a channel with associated communications link each with a second communication device and protocol connected by a second communications link transmitting and/or receiving messages via the second communications link time-stamp indication of events on the first communications link transfer the time value for the event to first unit via the first communications link time-stamp other events detected on the second communications link transfer time information for detection of other events to the first unit via the first communications link the first unit relates the local times to each other by utilization of time indications of first events the first unit relates time indications between other units for other events     A first unit PC PDA can consist of a logger unit     A first event can consist of an SOF     A first protocol can consist of USB, Ethernet, Bluetooth, IEEE 802.11,     A second unit consists of a CAN-USB interface, LIN-USB interface, CAN-Ethernet interface     A second protocol can consist of CAN, LIN, MOST, Ethernet, GPS     A second event can consist of receiving a message, transmission of a message or a sequence of messages, change from one status to another, execution of a program sequence, time indication from GPS     First protocol bandwidth >10* the bandwidth utilized by the second protocol If the first communications link is a USB link, then the characteristics of this up-link and down-link can be optimized with regard to the time delay between the first and second units by changing USB's standardized time tick of 1 ms (full speed) or 0.125 ms (high speed) to a value outside the specification.

The invention can also be regarded as a device for a time-conversion unit in systems with locally distributed modules, in which one or more modules comprise clocks, that works by means of messages in the system that transfer time indications for technical occurrences/events in the system. The time conversion unit comprises a receiving device for the said messages, and also a conversion device arranged to achieve adjustment of a second time indicated by means of a second clock in the first module or a second module to correspond to the first time or to the common time in the second clock, in response to the reception of a message that represents a first time indicated by a first clock in a first module. The time conversion unit is arranged to work independently and to render unnecessary setting of the second clocks or its module's time to the second time or the common time, and the conversion devices are arranged to effect the conversion in response to received messages and knowledge of the construction of the messages and their occurrence in the system. The invention thus relates to a device for time conversion units for messages of technical and time-related nature in locally distributed modularized systems, in which the unit comprises receiving devices for messages initiated in connection with the system comprising devices indicating technical system events in this. The unit is arranged partly to receive from the indicating units messages that represent at least two local time indications in at least one of several modules, and is also arranged with conversion devices that convert received first time indications with a first time parameter, for example a first clock speed, a first clock start time, etc, to second time indications with a second time parameter, for example a second clock speed, a second clock start time, etc. The conversion devices are arranged to effect the conversion in response to the received messages and knowledge of the construction of the messages and their occurrence in the system.

According to the above, a reference event consists of a first event that can be detected by at least one module in a system and that can be time-stamped by modules with the module's local clock and this event can either be detected and time-stamped by a second module connected only to the same system and/or another system or else the second module detects and time-stamps the occurrence of a second event, the occurrence of which can be related in time to the occurrence of the first event.

The invention is not limited to the embodiments described in the above as examples, but can be modified within the framework of the following claims and concept of the invention.

The invention claimed is:

1. An apparatus comprising:
   a plurality of modules, individual ones of which comprise:
      at least one associated clock configured to generate at least one time stamp of at least one event, wherein the at least one event is observed at one or more individual modules within the plurality of modules, and
      at least one processor device configured to generate at least one message containing the at least one time stamp;
   at least one time conversion unit separate from the plurality of modules and configured to not observe the at least one event and use the at least one message from a first module to relate the at least one event with the at least one message from a second module to create a comparative time;
   wherein the at least one time conversion unit is configured to convert a time associated with the first individual module to a time associated with the second individual module using the comparative time.

2. The apparatus of claim 1 wherein the individual ones of the plurality of modules are configured to detect at least one system event during a time period, wherein the at least one time conversion unit is configured to convert a local time domain of an individual one of the plurality of modules to a time domain associated with a different individual one of the plurality of modules, using the comparative time.

3. The apparatus of claim 1 wherein the at least one time conversion unit includes a logical conversion matrix comprising stored time stamps of a plurality of the events observed at one or more individual modules within the plurality of modules.

4. The apparatus of claim 1 wherein the time conversion unit is configured to communicate with a monitoring unit, wherein the time conversion unit is further configured to provide information relating to a time domain associated with the at least one message to the monitoring unit.

5. The apparatus of claim 1 wherein the at least one time conversion unit is configured to generate messages having time information relating to a local time base associated with an individual module within the plurality of modules.

6. The apparatus of claim 1 wherein the individual ones of the plurality of modules further comprise an event detector configured to detect events and to generate at least one signal to effect storage of the time associated to the at least one associated clock wherein the at least one associated clock is configured to generate a local time according to a local time base.

7. The apparatus of claim 1 wherein the at least one time conversion unit further comprises a clock wherein the clock is configured to time stamp the at least one event according to a time base.

8. An apparatus comprising:
   a plurality of modules, individual ones of which comprise:
      at least one associated clock configured to generate at least one time stamp of at least one event, wherein the at least one event is observed at one or more individual modules within the plurality of modules, and
      at least one processor device configured to generate at least one message containing the at least one time stamp;
   at least one time conversion unit configured to use the at least one message from a first module to relate the at least one event with the at least one message from a second module to create a comparative time;
   wherein the at least one time conversion unit is configured to convert a time associated with the first individual module to a time associated with the second individual module using the comparative time;
   wherein the at least one event is a start of frame packet sent by the time conversion unit.

9. The apparatus of claim 8 wherein the individual ones of the plurality of modules are configured to detect at least one system event during a time period, wherein the at least one time conversion unit is configured to convert a local time domain of an individual one of the plurality of modules to a time domain associated with a different individual one of the plurality of modules, using the comparative time.

10. The apparatus of claim 8 wherein the time conversion unit is configured to communicate with a monitoring unit, wherein the time conversion unit is further configured to provide information relating to a time domain associated with the at least one message to the monitoring unit.

11. The apparatus of claim 8 wherein the individual ones of the plurality of modules further comprise an event detector configured to detect events and to generate at least one signal to effect storage of the time associated to the at least one associated clock wherein the at least one associated clock is configured to generate a local time according to a local time base different from other ones of the plurality of modules.

12. A method comprising:
   receiving at a time conversion device a plurality of messages associated with at least one reference event in a modularized system wherein individual ones of the messages comprise a time stamped by a clock at a module in a modularized system using a first protocol, wherein the time stamped is associated with the at least one reference event; and
   correlating at the time conversion device a time stamped in a first message with a time stamped in a second message from a second modularized system using a second protocol different from the first protocol to derive a comparative time;
   converting at the time conversion device a time associated with at least one of the messages to a time associated with at least one other message associated with the modularized system using the comparative time.

13. The method of claim 12 further comprising:
detecting at the time conversion device at least one event during a time period;
converting a local time associated with the at least one event to a time domain associated with a module using the comparative time at the time conversion device.

14. The method of claim 12 wherein the correlating further comprises accessing a logical conversion matrix comprising stored time stamps of a plurality of the reference events of the modularized system.

15. The method of claim 12 further comprising using a module in the modularized system to generate information relating to a time domain associated with the message.

16. The method of claim 12 further comprising using a module in the modularized system to transmit messages having derived time information relating to a local time base associated with the module.

17. The method of claim 12 further comprising detecting events at a module in a modularized system and generating at least one signal at the module to effect storage of a time associated with the detected event according to a local time base.

18. The method of claim 12 further comprising using the time conversion device to capture a time stamped according to a time base determined from a clock associated with the time conversion device, wherein the time stamped is associated with the at least one reference event.

19. A method comprising:
receiving at a time conversion device a plurality of messages associated with at least one reference event in a modularized system wherein individual ones of the messages comprise a time stamped by a clock at a module in a modularized system, wherein the time stamped is associated with the at least one reference event; and
correlating at the time conversion device a time stamped in a first message with a time stamped in a second message to derive a comparative time;
converting at the time conversion device a time associated with at least one of the messages to a time associated with at least one other message associated with the modularized system using the comparative time;
wherein the at least one reference event is a receiving of a start of frame packet associated with a message.

20. The method of claim 19 further comprising:
detecting at the time conversion device at least one event during a time period;
converting a local time associated with the at least one event to a time domain associated with a module using the comparative time at the time conversion device.

21. An apparatus comprising:
a plurality of modules, individual ones of which comprise:
at least one associated clock configured to generate at least one time stamp of at least one event, wherein the at least one event is observed at one or more individual modules within the plurality of modules, and
at least one processor device configured to generate at least one message containing the at least one time stamp;
at least one time conversion unit configured to use the at least one message from a first module to relate the at least one event with the at least one message from a second module to create a comparative time;
wherein the at least one time conversion unit is configured to convert a time associated with the first individual module to a time associated with the second individual module using the comparative time;
wherein at least one of the plurality of modules further comprises:
a first data connection configured to communicate using a first communication protocol;
a second data connection configured to communicate using a second communication protocol;
wherein the at least one time conversion unit is configured to receive the at least one message from individual ones of the plurality of modules via the second data connection.

22. The apparatus of claim 21, wherein the at least one of the plurality of modules is configured to communicate with the plurality of modules via the first data connection, and wherein the at least one of the plurality of modules is configured to relay the at least one message to the at least one time conversion unit.

23. The apparatus of claim 21 wherein the individual ones of the plurality of modules are configured to detect at least one system event during a time period, wherein the at least one time conversion unit is configured to convert a local time domain of an individual one of the plurality of modules to a time domain associated with a different individual one of the plurality of modules, using the comparative time.

24. The apparatus of claim 21 wherein the time conversion unit is configured to communicate with a monitoring unit, wherein the time conversion unit is further configured to provide information relating to a time domain associated with the at least one message to the monitoring unit.

25. The apparatus of claim 21 wherein the individual ones of the plurality of modules further comprise an event detector configured to detect events and to generate at least one signal to effect storage of the time associated to the at least one associated clock wherein the at least one associated clock is configured to generate a local time according to a local time base different from other ones of the plurality of modules.

26. A method comprising:
receiving at a time conversion device a plurality of messages associated with at least one reference event in a modularized system wherein individual ones of the messages comprise a time stamped by a clock at a module in a modularized system, wherein the time stamped is associated with the at least one reference event; and
correlating at the time conversion device a time stamped in a first message with a time stamped in a second message to derive a comparative time;
converting at the time conversion device a time associated with at least one of the messages to a time associated with at least one other message associated with the modularized system using the comparative time;
wherein the receiving occurs via a first protocol over a first data connection between the time conversion device and at least one bridge module in the modularized system, and wherein the at least one bridge module further comprises a second data connection configured to communicate via a second data protocol.

27. The method of claim 26 further comprising:
detecting at the time conversion device at least one event during a time period;
converting a local time associated with the at least one event to a time domain associated with a module using the comparative time at the time conversion device.

* * * * *